UNITED STATES PATENT OFFICE.

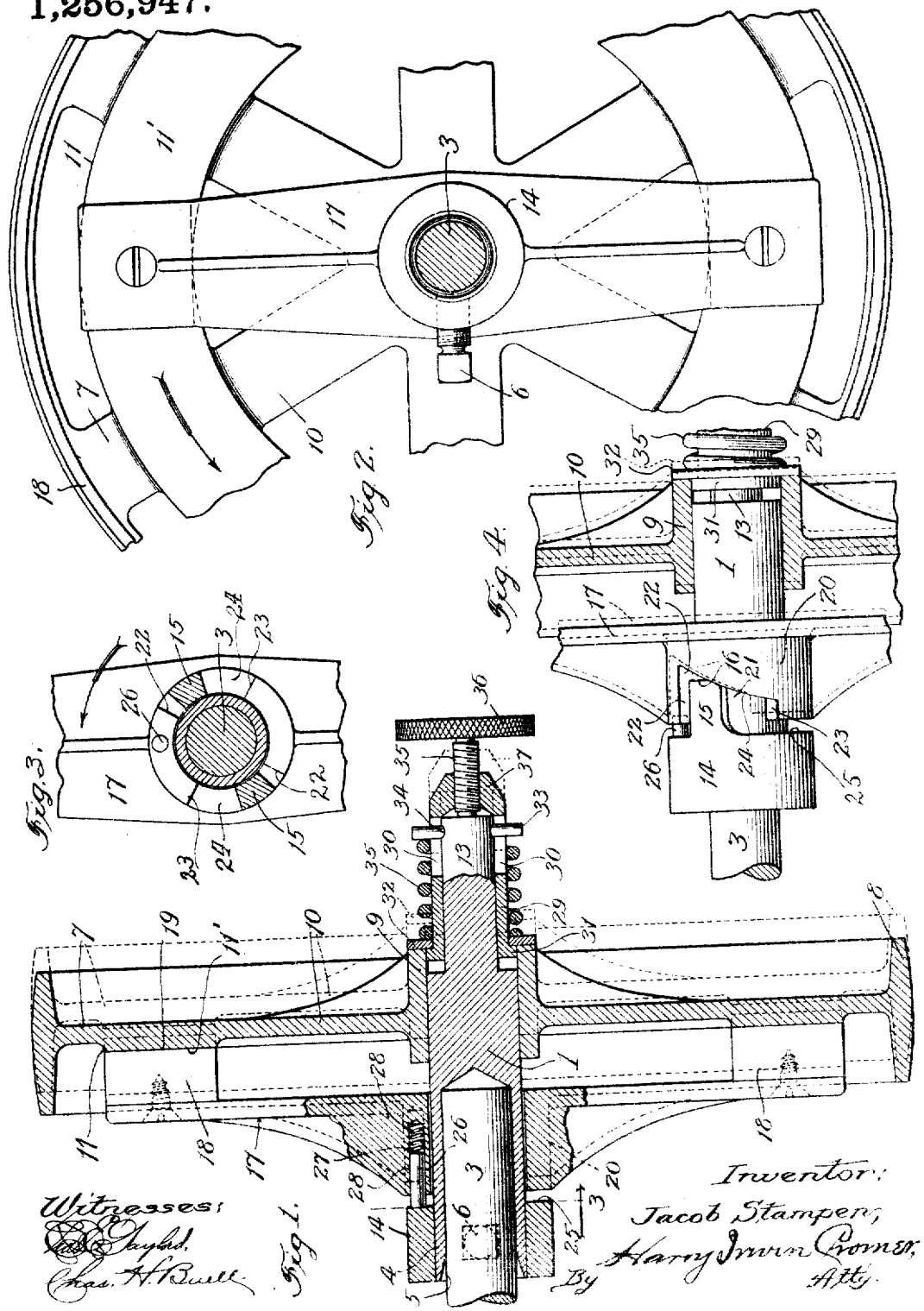

JACOB STAMPEN, OF CHICAGO, ILLINOIS.

AUTOMATIC STRESS-RELIEVING FRICTION-PULLEY OR POWER-TRANSMISSION MECHANISM.

1,256,947.  Specification of Letters Patent.  Patented Feb. 19, 1918.

Application filed May 1, 1916. Serial No. 94,635.

*To all whom it may concern:*

Be it known that I, JACOB STAMPEN, a citizen of the United States, residing in Chicago, in the county of Cook and State of Illinois, have invented certain new and useful Improvements in Automatic Stress-Relieving Friction-Pulleys or Power-Transmission Mechanisms, of which the following is a specification.

This invention relates to friction pulleys which are adapted to be connected with a shaft or mechanism to be driven, and with an engine or source of power, and which are so constructed as to enable the driven shaft or mechanism and the pulley mechanism to be automatically relieved of excessive stresses and strains while in operation or at the time of stopping or starting any of the mechanisms so connected.

The principal object of the invention is to provide a simple, economical and efficient automatic stress-relieving friction pulley.

A further object of the invention is to provide a friction pulley mechanism adapted to be connected with a shaft or mechanism to be driven, and with an engine or source of power, and of such construction and arrangement of parts as to enable the connected mechanisms to be automatically relieved of excessive stresses and strains, such for instance, as those which occur simultaneously with the impulses of an engine, or when an engine or the driven mechanism, or any of the connected mechanisms are started or stopped.

Other and further objects of the invention will appear from an examination of the following description and claims and from an inspection of the accompanying drawings, which are made a part of this specification.

The invention consists in the features, combinations, and details of construction herein described and claimed.

In the accompanying drawings:—

Figure 1 is a view in central vertical section of a pulley mechanism constructed in accordance with my invention, and showing the two-armed friction clutch member and wheel member in full lines in frictional clutching engagement, and out of clutching engagement in broken lines;

Fig. 2, a view in elevation of the mechanism shown in Fig. 1, with parts of the wheel—which may be a pulley or a toothed gear wheel, as desired—broken away;

Fig. 3, a detail view in transverse section taken on line 3 of Fig. 1, looking in the direction of the arrow, and showing the means for connecting the clutch member with the stub shaft or axle member, including two projecting cam portions and two slots into which the same extend, the slots having cam surfaces at the bottom; and Fig. 4, a detail view partly in side elevation and partly in section, showing the wheel and the clutch member with its inclined cam surfaces or cam-engaging slots in full lines in the position which they would occupy with respect to the axle member and its projecting cam members in normal position, and in broken lines in the position resulting from subjecting the parts to greater stresses.

In constructing an automatic stress-relieving, or self-relieving friction pulley in accordance with my invention and improvements, I provide a stub shaft or axle member 1, one end of which has a socket or hollow end portion 4 which is adapted to admit and fit snugly in engagement with a shaft 3, to be driven, and which shaft may be the main driving shaft of a cream separator or other mechanism to be operated. The socket portion or hollow end portion 4 of the stub shaft or axle is, by preference, provided with an inner tapered or beveled end portion 5 adapted to fit over a similarly tapered bushing, shaft or connecting member, for the purpose of enabling the pulley mechanism to be mounted upon or connected with shafts of unequal or varying sizes or diameters; and set screw 6, or similar suitable securing means, is provided for securing the stub shaft 1 to the shaft to be driven. A pulley wheel member 7 having a rim 8, a hub 9, a web portion or spokes 10, and an annular friction portion or ring 11, is rotatively mounted upon the cylindrical central portion 12 of the stub shaft 1, and is adapted to slide longitudinally of said stub shaft upon said cylindrical central portion which is, by preference somewhat larger in diameter than the relatively small end portion 13 of the stub shaft or axle member. The stub shaft has an enlarged end portion, collar or head 14 at the hollow end thereof, which head is provided with preferably a plurality of cam portions or cam-engaging members 15 located on opposite sides of the stub shaft and forming cam-engaging surfaces or cam faces 16. The cam surfaces 16, face endwise with respect to the stub shaft and are by preference disposed at an oblique angle with respect to the stub shaft and driven shaft similar to the angle of a left-handed helical screw thread—the normal direction of rotation of the stub shaft and driven shaft being in the direction indicated by the arrow in Fig. 2. (See Figs. 1 and 2.)

A friction clutch and cam member 17 having shoe or friction portions 18 which are by preference made of wood and provide friction surfaces 19 adapted to frictionally engage the adjacent surface of the annular friction member or ring 11, and having a hub portion 20 provided with slots or recesses 21 between forward shoulders 22 and rear shoulders 23, and having inclined or helical or approximately helical cam surfaces 24 disposed at approximately the same angle and adapted to slidably engage the corresponding cam surfaces 16, is interposed between the head 14 of the stub shaft 1 and the annular friction member 11 on the pulley wheel, and in position to loosely encircle the stub shaft at a point between the hub of the pulley wheel and the end face 25 of the head 14. The recesses or spaces 21 between the shoulders 22 and 23 on the clutch member 17 are spaced apart a sufficient distance to permit circumferential movement of said shoulders and of the clutch and cam member 17 with respect to the endwise projecting cam members 15 on the stub shaft or head 14. The clutch and cam member 17 is thus permitted to rotate forward with respect to the stub shaft and the clutch members 15 on the head 14 until the shoulders 23 come into engagement with the rear or adjacent side face of the corresponding cam member 15; and said clutch and cam member 17 is adapted to rotate rearward with respect to said stub shaft and the clutch members 15 a sufficient distance to cause the forward shoulders 22 at the forward extremity of the cam surfaces 24 to come into engagement with the front sides of the corresponding cam members 15, thus permitting the cam surfaces 16 to move forward and backward with respect to and in sliding engagement with the corresponding cam surfaces 24 on the clutch and cam member 17. It follows, as a matter of course, that the friction clutch and cam member 17, which is yieldingly held in frictional engagement with the annular friction member 11 on the pulley wheel by means of a spring-pressed bolt 26 mounted and movable endwise in an aperture 27 and pressed by the action of a compressible spring 28 in said aperture into sliding engagement with the end face 25 of the head 14, will rotate with the pulley wheel and with respect to the stub shaft and cam members 15 as the pulley wheel is driven in a normal or forward direction of rotation as indicated by the arrow in Fig. 2, thereby causing the cam faces 16 and 24 to come into frictional contact or engagement. The spring 28 is only sufficiently strong to cause a comparatively light frictional contact or pressure between the friction surfaces 19 of the shoes 18 and the friction surface of the annular friction member or ring 11 on the pulley wheel, said spring being sufficiently light and yielding so that, in the absence of any other pressure or force tending to press the clutch and cam member 17 toward the pulley wheel and its friction surface 11', the engagement between the cam members 15 on the stub-shaft head and the cam surfaces 24 on the clutch and cam member 17 will retard or entirely prevent the rotation of the latter with the pulley wheel. The stub-shaft will therefore not be rotated and the driven shaft 3 or driven mechanism will not be operated or driven by the pulley wheel or clutch and cam mechanism, but the pulley wheel will be permitted to rotate freely with respect to the stub shaft, and to rotate with respect to and with but slight sliding frictional contact with the clutch member 17, unless some force other than that produced by the spring 28 is utilized to press the clutch and cam member 17 more firmly against the annular friction surface of the ring 11 on the pulley wheel, or to press the pulley wheel with its friction surface 11' toward or more firmly into contact with the friction surfaces 19 of the clutch and cam member 17.

A sleeve or collar 29 having elongated peripheral slots 30 near one end thereof, and having an annular enlarged end portion 31 at or near the opposite end thereof, is mounted upon and in longitudinally movable or slidable relation to the stub shaft 1 which is encircled by said sleeve. The enlarged end portion or collar 31 is, by preference, cylindrical and of substantially the same but slightly smaller diameter than the inner diameter of the bore in the hub of the pulley wheel, and extends into and in sliding engagement with the latter, so as to form a bearing for one end of the hub of the wheel, and permit the pulley wheel to be moved or shifted longitudinally with respect to the stub-shaft, and also, by preference, longitudinally with respect to the sleeve 29, to a slight extent. A collar or washer 32 encircles the sleeve 29 and extends outward peripherally beyond that portion of the collar 31 which is encircled by the axial bore of the pulley wheel and into engagement with the end face of the hub of the pulley wheel on the opposite side of said wheel from that on which the clutch and cam members 7, 14 and 15, are located. The collar 32 is adjacent to and normally in contact with the collar 31 on the outer side of the latter, and is by preference in movable relation to said collar 31, rather than in one integral piece with the same. A pin 33 extends into a radial aperture 34 in the stub shaft, and radially beyond the periphery of the stub shaft and through one or both of the elongated openings or slots 30 in the sleeve 29, and radially beyond the periphery of said sleeve and in position to form a stop or abutment for a strong compressible spring 35 which is interposed between said pin 33 and the collar or washer 32 and pulley wheel. An adjusting screw 35 having an operating hand wheel or handle 36, is mounted in threaded engagement with a threaded end portion 37 of the sleeve 29, and in such position that the inner end of the screw engages the adjacent end of the stub shaft 1, so that the rotation of the screw in one direction will cause the sleeve 29 to be moved in one direction longitudinally of the stub shaft 1 and against the tension of the spring 35, compressing the spring and reducing the pressure of the spring 35 and spring-pressed collar 32 against the pulley wheel. The rotation of the screw in an opposite direction will release and permit the expansion of the compressible spring 35 and permit said spring to press the collar 32 against the adjacent end face of the pulley wheel, thereby causing the pulley wheel and its annular friction surface 11′ to be pressed toward and into yielding frictional engagement with the friction surfaces 19 of the shoes on the outer extremities of the arms of the friction clutch and cam member 17 and, at the same time, pressing the stub shaft 1 in an opposite direction, thereby causing the inclined cam surfaces 16 on the cam members 15 to be pressed into yielding sliding engagement with the adjacent inclined or helical cam surfaces 24 on the cam and clutch member 17, and pressing the latter toward and in yielding frictional engagement with the friction surface 11′ of the annular friction member or ring 11 on the pulley wheel. By rotating the set screw or adjusting screw 35 in the last mentioned direction to such an extent as to permit the sleeve 29 to be moved to the limit of its path of movement longitudinally of the stub shaft in the direction in which it is moved by the action of the spring 35, the pulley wheel is pressed toward the clutch and cam member 17, and the cam member 17 is pressed toward the cam members 15 on the stub shaft head 14, thereby causing the inclined cam surfaces 16 and the inclined or helical cam surfaces 24 on the clutch member 17 to be pressed into yielding sliding engagement with each other, as already suggested, and at the same time causing the friction clutch surfaces 19 and 11′ to be pressed together by the action of the strong spring 35, so that the rotation of the pulley wheel by means of a belt 38 on said wheel and connected with an engine—not shown—or other source of power, will cause the clutch and cam member 17 to rotate with said wheel in the direction in which the wheel and driven shaft are to be rotated or driven, or in the forward direction, as indicated by the arrow in Fig. 2, and cause the driven shaft and the mechanism connected therewith to be driven in a corresponding forward direction. By rotating the adjusting screw in the first mentioned direction or so as to compress the spring 35 between the collar 32 and pin 33 until the sleeve 29 and collar 32 have been moved to the extreme limit of their path of movement longitudinally of the stub shaft and away from the pulley wheel, the friction surfaces 19 and 11′ will be entirely relieved of all pressure produced by the action of the spring 35, the cam surfaces 16 and 24 are also relieved of all pressure or substantially all pressure produced by the action of said spring, and the pulley wheel is released and free to rotate with respect to and without driving or rotating the stub shaft, or the driven shaft with which the stub shaft is connected. The stub shaft and driven shaft and mechanism connected therewith are free to rotate when the pulley wheel is stopped. Injury to the parts, and danger to the operator which might otherwise result from the sudden stopping of the wheel are thus obviated.

With the sleeve 29 in the position which it occupies when at the limit of its path of movement in the direction in which it is pressed by the action of the spring 29, or in any intermediate position, with the cam surfaces 16 on the cam members 15 held yieldingly in engagement with the adjacent cam surfaces 24 on the clutch and cam member 17, and the friction surfaces 19 and 11′ pressed toward each other and held in engagement by the action of the spring 29, the excessive stresses and strains which are produced intermittently by the impulses or strokes of the engine cause the pulley wheel and the clutch and cam member 17 with its cam surfaces 24 to rotate forward with respect to the cam surfaces 16 on the cam members 15 and the stub shaft as the stresses are increased, and such forward relatively fast rotative movements are yieldingly resisted by the action of the spring 35 and by the yielding resistance which the cam surfaces 16 afford to the relative forward movement of the adjacent cam surfaces 24, but are permitted by the sliding engagement of said cam surfaces, and by the yielding of the spring 35. As the stresses or degree of force produced by or occurring with the intermittent strokes or impulses of the engine are diminished the speed of rotation of the pulley wheel and the clutch and cam member 17 is retarded with respect to the stub shaft and the cam members 15. The stub shaft and driven shaft and the cam members 15 are thus permitted to gain upon the pulley wheel and the clutch and cam member 17 during the intervals when the stresses are decreased, and the pulley wheel and the clutch and cam member 17 are permitted to gain upon the stub shaft and driven shaft during the intervals when the stresses are greatest at each impulse of the engine. Inequalities in speed of rotation of the driven shaft and stub shaft are thus reduced to a minimum, and a desired uniformity in speed of rotation and operation of the driven shaft and the mechanism driven thereby is obtained, and the excessive stresses and strains which occur intermittently and simultaneously with the impulses of the engine are automatically relieved and reduced to a minimum. The importance of the advantages thus obtained, particularly in connection with the operation of cream separators, wherein uniformity in speed of operation and gradual starting and stopping is highly desirable and difficult to obtain with internal combustion engines as the motive power, will be readily apparent to those skilled in the art.

The adjusting screw, when used with a pulley wheel and driven shaft which is to be rotated in a right-handed direction when in operation, is by preference a left handed screw. The operator is thus enabled to release the pulley by stopping the rotation of the adjusting screw while the machine is in operation at full speed or at any desired speed; and the screw and the sleeve 29 and spring 35 may be adjusted so that the tension of the spring and the pressure tending to press the cam surfaces 16 and 24, and the friction surfaces 19 and 11' together is controlled, and may be increased or diminished so as to correspond with or be in proportion to the load and the power required to drive the device to be operated.

The device is also adapted to relieve excessive stresses which may result from a varying load or varying degree of resistance to the action of a motor in driving a device under conditions in which the load varies.

All of the parts of the device are made of metal except the shoes 18, which are by preference of wood, as already suggested. The pulley wheel, including the rim, friction ring, web, or spokes and hub may be made of pressed steel, and all in one integral piece.

It will be readily understood and obvious to those skilled in the art to which this invention relates, that the wheel member may be in the form of a pulley wheel, as shown, or in the form of a toothed gear wheel, which may be one of a train of gears, or connected with a source of power in any desired ordinary and well known manner; and that the device is adapted to release and permit the free operation or rotation of the driven shaft with which the stub shaft or axle is connected, when the wheel member, whether in the form of a pulley wheel or a gear wheel, is retarded or suddenly stopped, thus preventing injury to the pulley mechanism or power transmission mechanism or to the driving or driven mechanism with which the same is connected.

I claim:—

1. In a mechanism of the class described, an axle, a wheel member mounted in rotative relation to said axle and provided with a friction surface adapted to engage a clutch member, a cam connected and rotatable with the axle, a clutch member having a friction surface in engagement with said first mentioned friction surface, and having a cam surface in sliding engagement with said first mentioned cam, and resilient means tending to press said clutch member and said first mentioned friction surface into engagement with each other.

2. In a pulley mechanism, the combination of an axle, a pulley wheel mounted in concentric rotative relation to said axle and provided with a friction surface for engaging a clutch member, a cam upon and rotatable with the axle, a clutch member having a friction surface in engagement with said first mentioned friction surface, and having a cam surface in sliding engagement with said first mentioned cam, and resilient means operatively connected with the axle and in operative engagement with the pulley wheel and acting to press said cam surface of the clutch member and said first mentioned cam into sliding engagement with each other.

3. In a pulley mechanism, the combination of an axle, a pulley wheel mounted upon and in rotative relation to said axle, and provided with a friction surface for engaging a clutch member, a cam upon and rotatable with said axle, a clutch member in engagement with said friction surface and having a cam surface disposed in oblique relation to the axial center of the axle and in sliding engagement with said first mentioned cam, and resilient means connected with the axle and tending to press said clutch member and the friction surface engaged thereby into engagement with each other.

4. In a pulley mechanism, the combination of an axle, a pulley wheel mounted upon and in rotative relation to said axle and provided with a friction surface for engaging a clutch member, a cam in fixed relation to said axle and having a cam surface facing toward the pulley wheel, a clutch member interposed between said cam and said pulley wheel and in engagement with said friction surface upon the pulley wheel, said clutch member being movable circumferentially with respect to the axle, and having a cam surface disposed in oblique relation to the axis of the axle and in sliding engagement with said first mentioned cam, and resilient means connected with the axle and in operative engagement with the pulley wheel and adapted to press the pulley wheel and said interposed clutch member longitudinally with respect to the axle and toward the first mentioned cam.

5. In a pulley mechanism, the combination of an axle, a pulley wheel mounted in concentric rotative relation to said axle, a cam in fixed relation to said axle, a clutch member adapted to be connected with the pulley wheel and having a cam surface disposed in oblique relation to the axis of the axle and in sliding engagement with said first mentioned cam, and spring mechanism operatively connected with the axle and in operative engagement with the pulley wheel and adapted to press said oblique cam surface and said first mentioned cam into engagement with each other.

6. In a pulley mechanism, the combination of an axle, a pulley wheel mounted in concentric rotative relation to said axle and provided with a friction surface for engaging a clutch member, a cam in fixed relation to said axle, a clutch member having a friction surface in engagement with said first mentioned friction surface and having a cam surface disposed in oblique relation to the axis of the axle and in sliding engagement with said first mentioned cam, and a spring-pressed axle-encircling member movable longitudinally of the axle and in engagement with the pulley wheel, for holding the wheel in position to be operatively engaged by said clutch member.

7. In a pulley mechanism, the combination of an axle, a pulley wheel mounted in rotative relation to and movable longitudinally of the axle, a cam in fixed relation to said axle, a clutch member mounted upon and movable circumferentially and longitudinally of the axle and adapted to be clenched with the pulley wheel and disconnected from clutching engagement with the same, said clutch member having a cam surface disposed in oblique relation to the axis of the axle and in sliding engagement with said first mentioned cam, and spring mechanism operatively connected with the axle and adapted to press the pulley wheel longitudinally of the axle and in the direction of said clutch and cam members.

8. In a pulley mechanism, the combination of an axle, a pulley wheel mounted in rotative relation to and movable longitudinally of the axle, a cam upon and rotatable with said axle, a clutch member mounted upon and movable circumferentially and longitudinally of the axle and adapted to be connected in clutching engagement with the pulley wheel, said clutch member having a cam surface disposed in oblique relation to the axis of the axle and in sliding engagement with said first mentioned cam, and resilient means connected with the axle and in operative engagement with the pulley wheel, and adapted to press the pulley wheel and said clutch member and oblique cam surface in the direction of the first mentioned cam.

9. In a pulley mechanism, the combination of an axle, a pulley wheel mounted in rotative relation to the axle, a clutch member adapted to be connected with the pulley wheel, said clutch member and axle member having cam surfaces in sliding engagement with each other, and resilient means in operative engagement with the pulley wheel and comprising a spring connected with the axle and tending to press said cam surfaces into yielding sliding engagement with each other.

10. In a device of the class described, the combination of an axle, a wheel member mounted upon and rotative with respect to the axle, a clutch member adapted to be connected with the pulley wheel, said clutch member and axle member having cam surfaces in sliding engagement with each other, one of said cam surfaces being in oblique relation to the axis of the axle, and resilient means comprising a spring connected with the axle and tending to press said cam surfaces into yielding engagement with each other.

11. In a pulley mechanism, the combination of an axle, a pulley wheel mounted upon and rotative with respect to the axle and provided with a friction surface adapted to engage a friction clutch member, a clutch member mounted upon the axle and in engagement with said friction surface, means for connecting the clutch member with the axle member, and resilient means comprising a spring connected with the axle member on the opposite side of the pulley wheel from that on which said clutch member is located, and adapted to press the clutch member and the friction surface of the pulley wheel member into engagement with each other.

12. In a pulley mechanism, the combination of an axle, a pulley wheel mounted in rotative relation to and movable longitudinally with respect to the axle, a clutch member mounted on the axle and adapted to be connected with the pulley wheel, said clutch member and axle member each having cam surfaces on opposite sides of the axial center of the axle and in sliding engagement with each other, and resilient means comprising a spring connected with the axle member on the opposite side of the pulley wheel from that on which said clutch member is located and adapted to press the cam surfaces of the axle member into engagement with the cam surfaces of the adjacent clutch member.

13. In a pulley mechanism, the combination of an axle, a pulley wheel mounted in rotative relation to and movable longitudinally with respect to the axle, a clutch member mounted upon and movable longitudinally with respect to the axle, said clutch member and axle member having cam surfaces in sliding engagement with each other, resilient means interposed between the axle member and said clutch member and tending to press the latter into clutching engagement with the pulley wheel, and resilient means connected with the axle and in operative engagement with the pulley wheel on the opposite side of said wheel from that upon which said clutch member is located, and adapted to hold said cam surfaces in engagement with each other.

14. In a pulley mechanism, the combination of an axle, a pulley wheel mounted upon and rotative with respect to the axle, a clutch member adapted to be connected with the pulley wheel, said clutch member and axle member having cam surfaces in sliding engagement with each other, a cam surface of one of said members being in oblique relation to the axial center of the axle, resilient means comprising a spring connected with the axle and tending to press said cam surfaces each into yielding engagement with an adjacent cam surface, and means for compressing and releasing the tension of the spring.

15. In a pulley mechanism, the combination of an axle, a pulley wheel mounted in rotative relation to and movable longitudinally with respect to the axle, a clutch member mounted upon and movable longitudinally of the axle and adapted to be connected in clutching engagement with the pulley wheel, said clutch member and axle member having cam surfaces in sliding engagement with each other, a cam surface of one of said members being in oblique relation to the axis of the axle, resilient means in operative engagement with the pulley wheel and comprising a spring connected with the axle and adapted to press said cam surfaces into yielding engagement with each other, and means for compressing and releasing said spring.

16. In a pulley mechanism, the combination of an axle provided with a cam-engaging member fixed thereto, a pulley wheel mounted upon and movable longitudinally of and rotative with respect to the axle, a clutch member interposed between said cam engaging member and the pulley wheel and adapted to be connected with said wheel, said clutch member having cam surface portions in sliding engagement with said cam engaging member, and resilient means in operative engagement with the pulley wheel and comprising a spring tending to press the pulley wheel and said clutch member toward the cam-engaging member on the axle.

17. In a pulley mechanism, the combination of an axle provided with a cam member fixed thereto, a pulley wheel mounted upon and rotative with respect to the axle, a clutch member adapted to be connected with the pulley wheel, and provided with a cam member upon said clutch member and in sliding engagement with the first mentioned cam member, resilient means in operative engagement with the pulley wheel and comprising a spring connected with the axle and tending to press the pulley wheel and one of said cam members in the direction of the other of said cam members, and means for compressing and releasing the spring.

18. In a pulley mechanism, the combination of an axle, a pulley wheel rotatively mounted upon and movable longitudinally with respect to the axle, a cam member fixed to the axle and having a plurality of cam-engaging portions upon and in fixed relation to the axle member, a clutch member adapted to be connected with the pulley wheel and having a plurality of cam surface portions in sliding engagement with said cam engaging portions, resilient means in operative engagement with the pulley wheel and comprising a spring connected with the axle and tending to press the pulley wheel and said clutch member in the direction of the first mentioned cam-engaging portions upon the axle member, and means for compressing and releasing the tension of the spring.

19. In a pulley mechanism, the combination of an axle, a pulley wheel mounted upon and rotative with respect to the axle and provided with a friction surface adapted to engage a friction clutch member, a clutch member mounted upon the axle and in engagement with said friction surface, means for connecting the clutch member with the axle member, a sleeve member mounted upon and movable longitudinally of the axle and in operative engagement with the pulley wheel on the opposite side of said wheel from that on which said clutch member is located, a spring connected with the axle member and in operative engagement with said sleeve member and adapted to tend to press the sleeve member toward and into operative engagement with the pulley wheel, and an adjusting screw in threaded engagement with the sleeve and having its inner end in engagement with the axle, for adjusting the sleeve to compress and release the spring.

Signed at Chicago, Illinois, April 24, 1916.

JACOB STAMPEN.

Witness:
HARRY IRWIN CROMER.